United States Patent [19]

Meadows et al.

[11] Patent Number: 5,527,642

[45] Date of Patent: Jun. 18, 1996

[54] BIPOLAR BATTERY

[75] Inventors: Clarence A. Meadows, Muncie;
Robert E. Adams, Selma, both of Ind.

[73] Assignee: General Motors Corporation, Detroit, Mich.

[21] Appl. No.: 346,990

[22] Filed: Nov. 30, 1994

Related U.S. Application Data

[63] Continuation of Ser. No. 79,033, Jun. 21, 1993, abandoned.
[51] Int. Cl.⁶ .......................... H01M 10/18; H01M 2/30
[52] U.S. Cl. .......................... 429/210; 429/178; 429/185
[58] Field of Search ........................... 429/210, 57, 178, 429/185

[56] References Cited

U.S. PATENT DOCUMENTS

| | | | |
|---|---|---|---|
| 2,471,781 | 5/1949 | Schmidt | 136/12 |
| 3,003,012 | 10/1961 | Duddy | 429/210 X |
| 3,003,013 | 10/1961 | Duddy | 429/210 X |
| 3,600,233 | 8/1971 | Coffey et al. | 136/134 R |
| 3,728,158 | 4/1973 | Poe et al. | 136/10 |
| 4,008,099 | 2/1977 | Lindstrom | 429/210 X |
| 4,178,216 | 12/1979 | Nordblom et al. | 204/2.1 |
| 4,275,130 | 6/1981 | Rippel et al. | 429/144 |
| 4,605,604 | 8/1986 | Pollack et al. | 429/210 X |
| 4,658,499 | 4/1987 | Rowlette | 29/623.1 |

FOREIGN PATENT DOCUMENTS

| | | |
|---|---|---|
| 0402265 | 6/1990 | European Pat. Off. . |
| 1024163 | 3/1953 | France . |
| 1214394 | 4/1960 | France . |
| 2304188 | 3/1976 | France . |
| 1195673 | 7/1989 | Japan . |
| 281018 | 11/1927 | United Kingdom . |
| 2160704 | 12/1985 | United Kingdom . |
| 87/04011 | 7/1987 | WIPO . |

OTHER PUBLICATIONS

European Search Report Application No. EP 94 20 1564 corresponding to U.S. Ser. No. 08/079,033 dated 11 Oct. 1994.
Annex to the European Search Report Application No. EP 94 20 1564.
W. E. Rippel, "Bipolar Battery Using Conductive-Fiber Composite", NASA Tech Briefs, pp. 20,22, Feb. 1989.

Primary Examiner—John S. Maples
Attorney, Agent, or Firm—Lawrence B. Plant

[57] ABSTRACT

A bipolar battery comprising a plurality of framed, bipolar electrodes stacked together and embedded in a housing molded in situ thereabout. The housing will preferably comprise a polymeric foam.

5 Claims, 5 Drawing Sheets

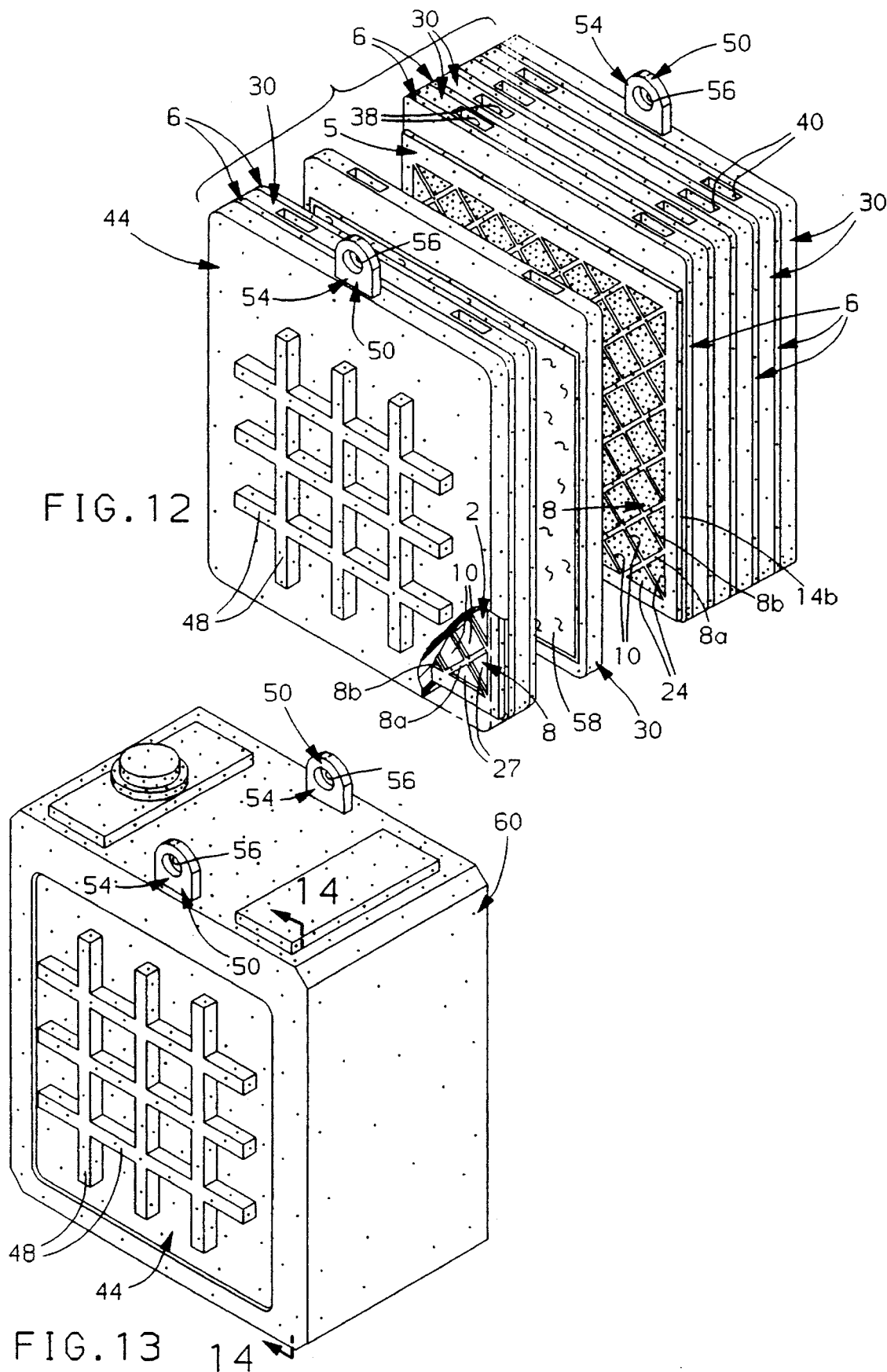

BIPOLAR BATTERY

This is a continuation of application Ser. No. 08/079033 filed on 21 Jun. 1993, now abandoned.

This invention relates to bipolar electric storage batteries of the face-to-face electrode type, and more particularly to a unique packaging arrangement therefor and method of assembling the battery.

BACKGROUND OF THE INVENTION

Bipolar batteries employ either one of two types of bipolar electrodes, i.e., face-to-face or side-by-side. Face-to-face type bipolar electrodes, utilize an electrolyte resistant, impervious, substantially planar, conductive septum having a first polarity active material on one face thereof and an opposite polarity active material on the opposite face thereof. It is known for the electrically conductive septum that separates the opposite polarity active materials of the bipolar electrode to comprise either (1) a thin metal plate (e.g., lead in the case of a Pb-acid battery), (2) an electrically conductive polymer, or (3) a nonconductive polymer having a plurality of rivet-like conductors embedded therein for electrically communicating one face of the septum to the other. For a number of reasons, the use of solid metal plates is preferred for long-lived, high power, bipolar batteries. A metal plate septum particularly useful for lead acid batteries is described in copending U.S. patent application U.S. Pat. No. 5,344,727 and assigned to the assignee of the present invention. Other metal or conductive septums are useful with other types of battery systems (e.g., alkaline batteries) as is well known in the art.

The bipolar electrodes are mounted in nonconductive frames and stacked together such that opposite polarity faces of adjacent bipolar electrodes oppose each other across an electrolyte-filled gap which also contains an electrolyte-permeable, dendrite-suppressing separator (e.g., microporous polyethylene, glass mat, microporous PVC, etc.). One such battery is exemplified by the patent to Poe et al 3,728,158, assigned to the assignee of the present invention.

The frames used to mount the bipolar electrodes are typically either clamped or adhesively secured together to form the finished battery. Neither are practical solutions to making such batteries. In this regard, clamping the frames typically adds extra weight to the system and results in an assembly susceptible to electrolyte leakage via any of the many seams between the many abutting frames. Adhesively securing the frames together on the other hand is extremely messy especially when coupled with all of the handling, alignment, and assembly requirements for so many individual components to form the finished battery.

It is an object of the present invention to provide a unique bipolar battery packaging arrangement for face-to-face type bipolar batteries which includes a plurality of bipolar electrodes each engaged on its perimeter by a nonconductive frame, wherein the frames are stacked together and embedded in a polymeric material molded in situ thereabout to seal the several seams and form the battery's housing. It is another object of the present invention to provide such a battery wherein the housing comprises a closed cell foam. It is a further object of the present invention to provide a unique method of assembling a gas-recombinant version of said battery having compressed fibrous glass mat separators of the type described in U.S. Pat. No. 3,862,861. These and other objects and advantages of the present invention will become more readily apparent from the detailed description thereof which follows.

BRIEF DESCRIPTION OF THE INVENTION

As a preferred application of the present invention involves Pb-acid storage batteries, the invention will be described in terms thereof, though it is not limited to such batteries. In a Pb-acid bipolar battery, the bipolar electrode comprises a lead plate septum having an adherent, porous coating on at least one face (preferably both faces) thereof for securely anchoring a leady active material thereto. The coating comprises multiple layers of arc-sprayed, lead particles fused to each other, and to the face of the septum, providing a plurality of interconnecting, interstitial pores for anchoring a leady active material (i.e., Pb, PbO, $PbO_2$, etc.) to the septum (see U.S. Pat. No. 5,344,727). The bipolar electrodes are mounted in nonconductive frames, have nonconductive lattices overlaying the faces thereof and are stacked together with spacer frames and monopolar electrodes (i.e., at the ends of the stack) to form a complete bipolar battery as described in more detail in U.S. Pat. No. 5,326,650, assigned to the assignee of the present invention and filed concurrently herewith. The monopolar electrodes in the end cells will preferably each comprise one of the bipolar electrodes having active material applied to only one face thereof. The battery's terminal will preferably be molded into the end wall of the battery and contain tangs projecting therefrom into contact with the unpasted face of the bipolar electrode serving as a monopolar electrode. The tangs are preferably induction welded to the septum of the monopolar electrode after the battery has been assembled.

In accordance with the present invention, the several frames are embedded in a polymeric (e.g., thermoplastic or thermoset polymer) housing molded in situ thereabout to embed the stack and shape the outside surface of the housing. In this regard, the electrode stack, along with end plates for the battery are clamped together in a mold cavity and fluid polymeric material flowed thereabout to fill the cavity and form the housing for the battery. Preferably, the housing will be formed by injection molding hot thermoplastic (e.g., polyolefins such as polyethylene, polypropylene, etc.) into the cavity so as to embed the stack therein. Thermoset polymers may also be used. Most preferably, the polymer will contain a foaming agent therein, which upon heating causes gases to form and foam the polymer. The use of foaming agents causes low pressure expansion of the polymer for ready filling of the mold cavity without subjecting the electrode stack to deleteriously high injection molding pressures (e.g., Ca. 12,000 to 16,000 psi) otherwise required to insure complete "fill-out" of the mold cavity and reduce shrinkage following coating. With the use of foaming agents in the polymer the injection molding pressures can be reduced to about ¼ to about ⅓ the pressure otherwise required, depending on the amount of foaming agent used. Molding the housing directly about the stack not only simplifies and combines the housing formation and battery assembly processes into a single operation but also prevents any leakage from between the seams of the stack. In the case of a gas-recombinant-type lead-acid battery having glass mat separators compressed between the electrodes, the mats are compressed by applying force to the ends of the stack, placing the stack into a mold under compression, and molding the housing about the stack to hold the stack under compression. In a preferred embodiment, the mold halves serve to compress the stack.

DETAILED DESCRIPTION OF SPECIFIC EMBODIMENTS

The invention will be better understood when considered in the light of the following detailed description of a specific, preferred embodiment thereof which is given hereafter in conjunction with the several figures wherein:

FIG. 12 is an exploded view of a bipolar battery stack;

FIG. 13 is a perspective view of a bipolar battery in a separate housing; and

Figure 1:
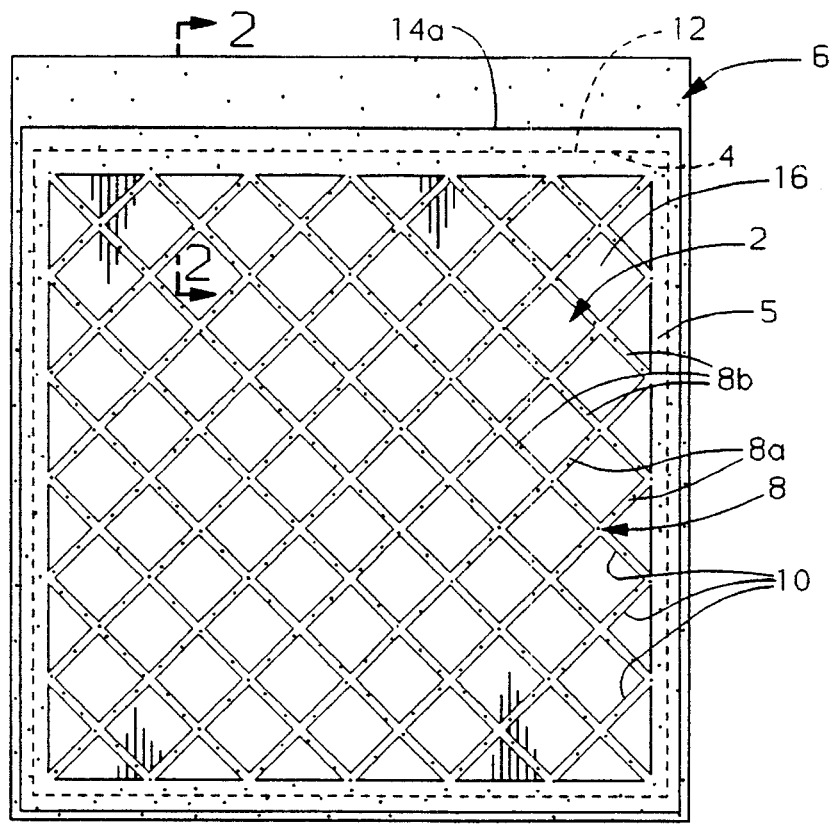
FIG. 1 is a front, elevational view of a bipolar electrode in accordance with the present invention.
Figure 2:
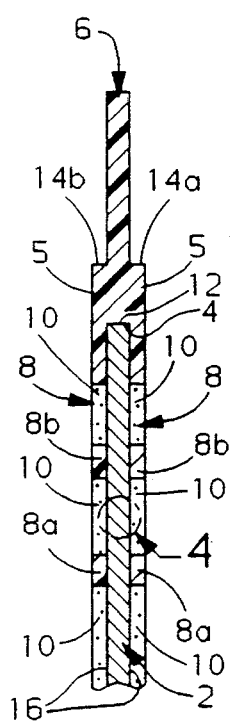
FIG. 2 is a sectioned, side elevational view in the direction 2—2 of FIG. 1.
Figure 3A:
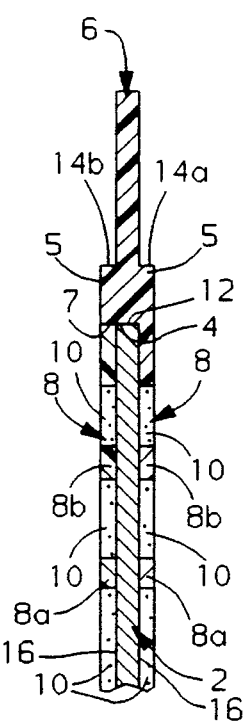
FIGS. 3a, 3b and 3c are views like FIG. 2 of alternative embodiments to the frame and lattice shown in FIG. 2.
Figure 3B:
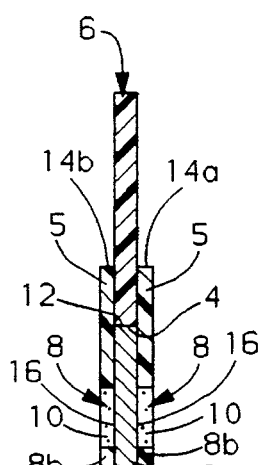
Figure 3C:
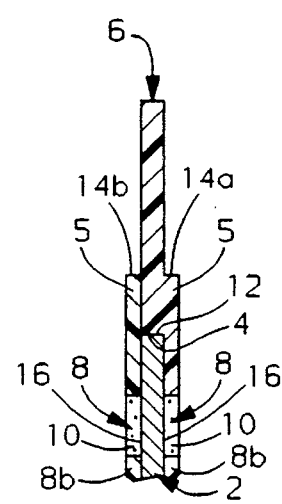
Figure 4:
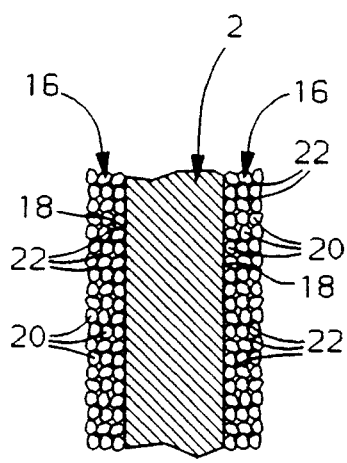
FIG. 4 is a magnified view of the zone 4 of FIG. 2.
Figure 5:
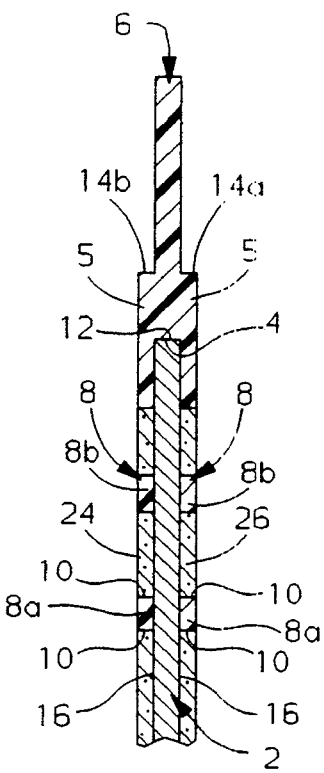
FIG. 5 is a view like that of FIG. 2, but having active material pasted on both sides of the electrode.

FIGS. 1–5 depict a bipolar electrode comprising a lead septum plate 2 encompassed by a nonconductive plastic frame 6 having an inner rim 4 engaging the periphery of the plate 2. The frame 6 is preferably insert molded about the plate 2, by positioning the plate in a mold and molding the frame thereabout. Nonconductive (e.g., polyolefin) lattices 8 comprising a plurality of crisscrossing lattice wires 8a and 8b define a plurality of pockets 10 overlaying the faces on opposite sides of the septum plate 2. As shown in FIG. 2, the lattices 8 may be molded as one piece with the frame 6 such that the border 5 of the lattices 8 are molded with the frame 6 around the edge 12 of the plate 2. Alternatively, and as shown in FIGS. 3a, 3b and 3c, one or both of the lattices 8 may be molded separately from the frame 6 and subsequently made integral therewith by bonding (e.g., heat sealing, ultrasonically bonding or adhesively bonding) thereto. As shown in FIG. 3a, the edge 12 of the plate 2 is coextensive with the edges 7 of borders 5 of the lattices 8, and the frame 6 is then molded thereabout so as to bond to the edges 7 of the lattices 8 and become integral therewith. FIGS. 3b and 3c show other self-evident variations of the junction between the lattice borders 5 and frame 6.

Shoulders 14a and 14b are formed at the junction between the borders 5 of the lattices 8 and the frame 6 and extend completely around the lattice 8. Like mesas, the lattices 8 stand in relief above the faces 9a and 9b of the frame 6, and are sized to nest in complementary-shaped recesses formed in a spacer frame (to be described hereinafter) for aligning and interlocking the several frames together and preventing lateral shifting thereof with respect to each other, and for providing a sufficiently large interfacial area between abutting frames to achieve a good electrolyte seal therebetween.

In the case of a Pb-acid bipolar battery having a septum comprising a lead plate, a porous coating 16 is provided on at least one face 18 of the septum plate 2 before, which coating comprises multiple layers of lead particles 20 fused to each other, and to the face 18, so as to define a plurality of interconnecting interstitial pores 22 therebetween. This coating is preferably formed by arc-spraying a plurality of molten lead droplets onto the face 18 of the plate 2 as described in copending U.S. Pat. No. 5,344,727 (supra).

For the preferred embodiment shown in FIG. 2, the septum plate 2 is placed in an appropriate mold, and a plastic (e.g., thermoplastic or thermoset) injected thereabout to concurrently form the frame 6 and lattice 8 in a single "insert-molding" operation.

Following mounting in the frame/lattices, an active material 24 having a first polarity, and an active material 26 having a second polarity is spread into the pockets 10 of the lattices 8, and in the case of a Pb-acid battery, pressed into the coating 16 so as to impregnate the pores 22 thereof sufficiently to anchor the active material thereto.

Figure 6:
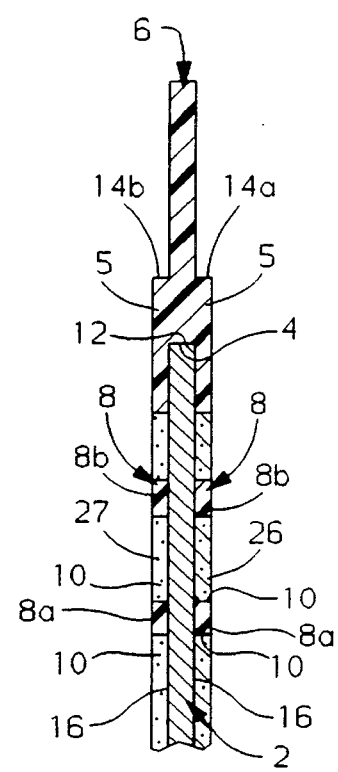
FIG. 6 is a view like FIG. 5, but with active material pasted on only one face of the electrode to form a monopolar electrode.

As best shown in FIG. 6, one of the "bipolar" electrodes described above may be used as a monopolar electrode (i.e., for use in the end cells of the battery) by pasting only one face thereof with active material paste 26. In the end cell, the pasted side 26 will confront an opposite polarity face of any adjacent bipolar electrolyte, while the unpasted face 27 will confront the end wall 44 of the battery. At one end of the battery, the active material paste on the monopolar electrode will comprise positive active material, and at the other end of the battery, the active material paste on the monopolar electrode will comprise negative active material. Alternatively, conventional pasted, grid-type monopolar electrodes mounted in an appropriate frame may be used as the monopolar electrodes in the end cells.

Figure 7:
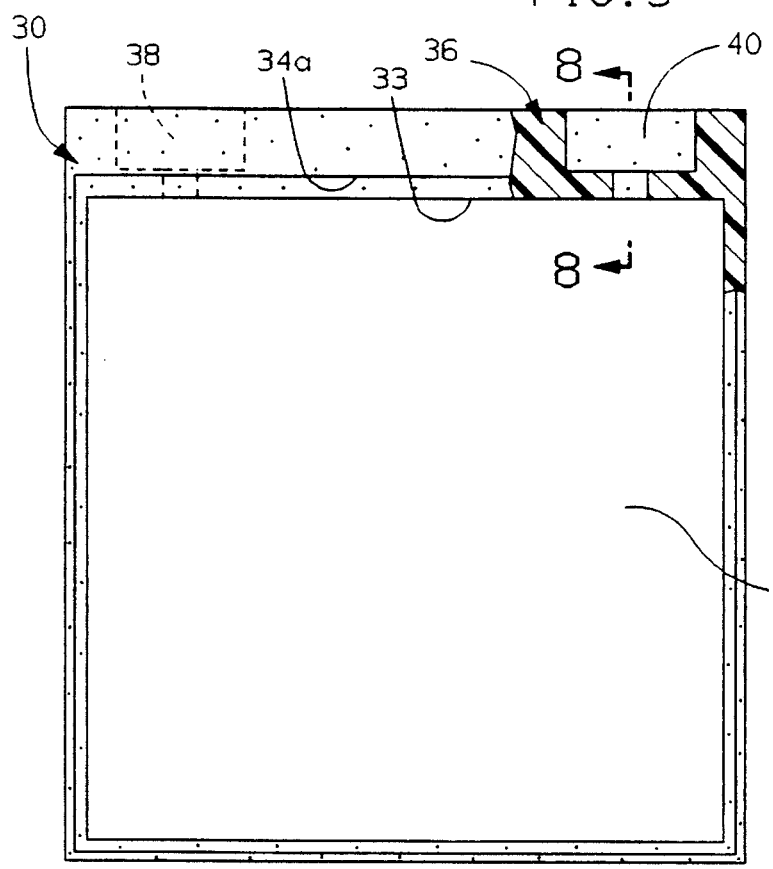
FIG. 7 is a partially sectioned, front, elevational view of a interelectrode, spacing frame.
Figure 8:
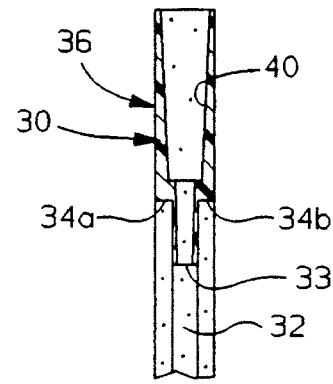
FIG. 8 is a view in the direction 8—8 of FIG. 7.

FIGS. 7 and 8 depict a spacer frame 30 which, in the finished battery, serves to space one bipolar electrode 2 from the next adjacent electrode (i.e., bipolar or monopolar) in the stack, and to define a region 32 between opposing faces of the adjacent electrodes for containing the battery's electrolyte and interplate separator (e.g., gas-recombinant-battery-type glass mat 58). For convenience of handling and assembly, it is desirable to mold/embed the edges of the separator (e.g., glass mat 58) directly into the frame 30, (not shown). The spacer frame 30 contains annular recesses 34a and 34b formed in the faces thereof and contiguous the inner rim 33 which recesses are sized to receive, in nesting fashion, the shoulders 14a and 14b surrounding the mesa-like lattices 8. In lieu of the aforesaid spacer, the electrode frames themselves may be widened, or the like, in the direction normal to the principal plane of the electrode to provide an interelectrode electrolyte region without the need for a separate spacer frame 30. The upper legs 36 of each of the spacer frames 30 include openings 38 and 40 for admitting electrolyte into the regions 32 and/or for venting the cells as may be required after the cell stack has been assembled. A single such opening may be used in lieu of two openings.

Figure 9:
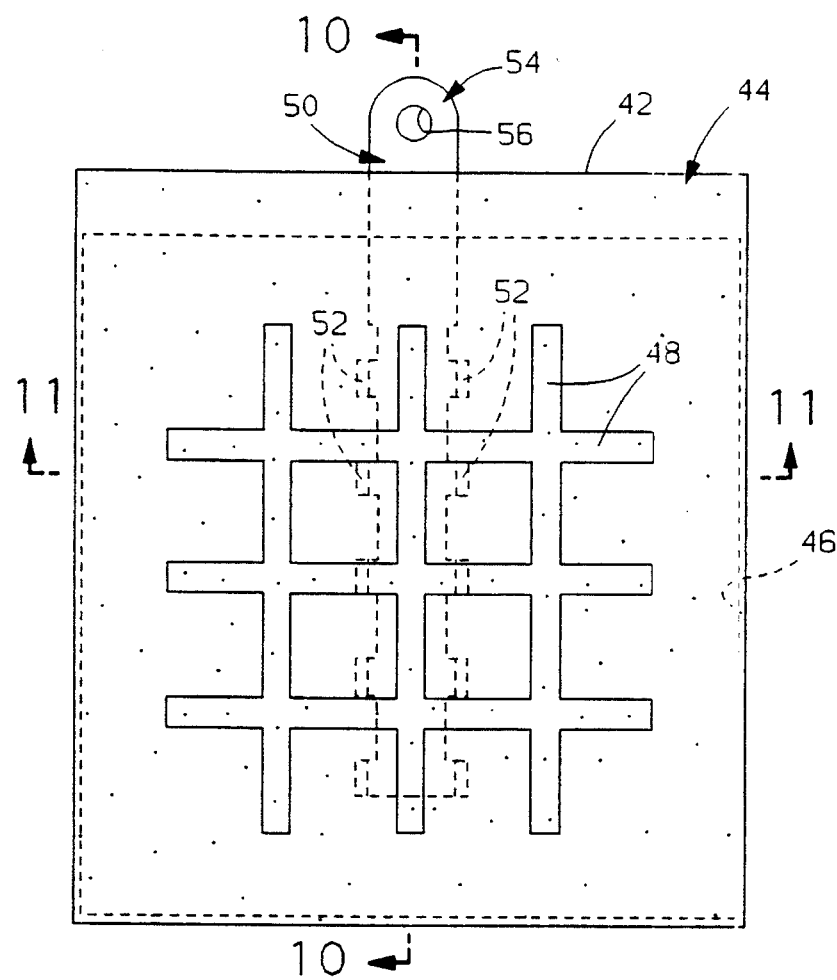
FIG. 9 is a front elevational view of an end wall of a bipolar battery.
Figure 10:
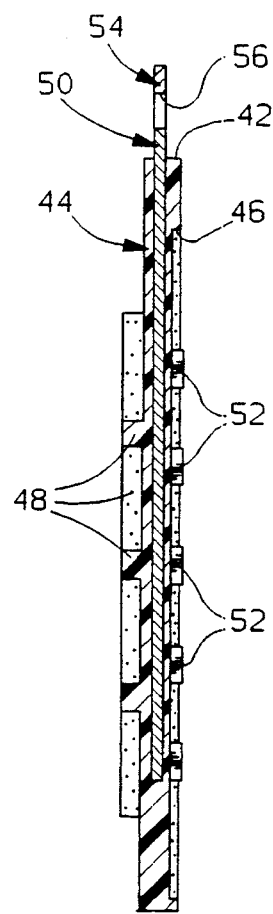
FIG. 10 is a view in the direction 10—10 of FIG. 9.
Figure 11:
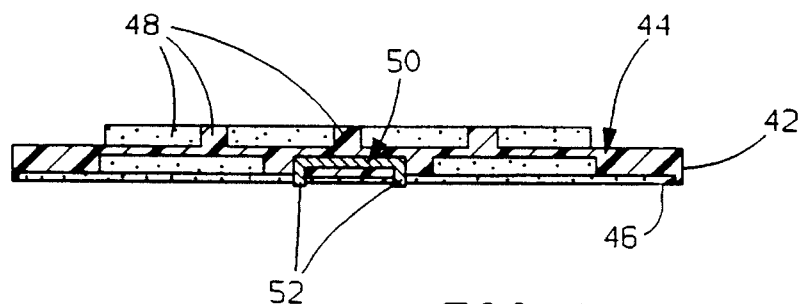
FIG. 11 is a view in the direction 11—11 of FIG. 9.

FIGS. 9–11 depict an end wall 44 of a bipolar electrode stack. The wall 44 comprises a nonconductive (e.g., thermoplastic or thermoset plastic) material having an annular recess 46 therein adapted to receive a shoulder 14a or 14b on one of the monopolar electrodes discussed above (see FIG. 6). A plurality of crisscrossing ribs 48 on the outside of the wall 44, opposite the recess 46, stiffen the end wall 44 and prevent bulging thereof. A metal blade 50 having a plurality of tangs 52 projecting outwardly therefrom into the end cell of the battery, is insert-molded into the wall 44 and extends beyond the peripheral edge 42 thereof to form a terminal 54 for the battery. The terminal 54 has an appropriate aperture 56 adapted to receive a bolt, or the like, for connecting to an external electrical circuit. The tangs 52 projecting from the blade 50 extend into contact with the unpasted face of the septum plate 2 and are induction welded thereto after the stack has been assembled. The blade 50 will preferably comprise Sn-coated or Pb/Sn-coated copper wherein the Sn or Pb/Sn coating promotes bonding to the plastic forming the wall 44, and facilitates induction welding of the septum plate 2. Any conductive, corrosion-resisted metal, e.g., titanium, can be used in place of copper.

Figure 14:
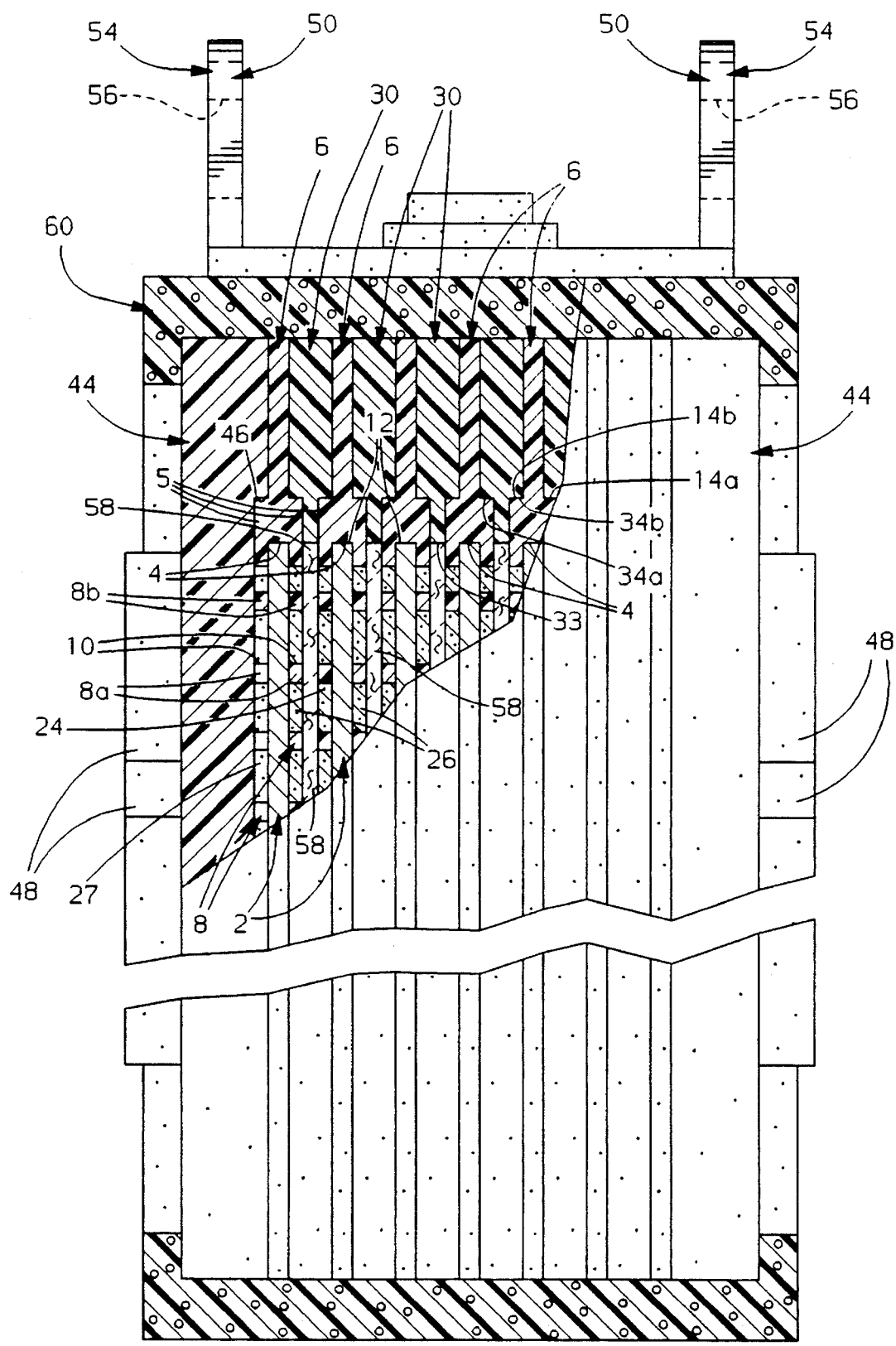
FIG. 14 is a sectioned, side view in the direction 14—14 of FIG. 13.

FIGS. 12–14 show a bipolar electrode stack before and after encasement in a separate housing. FIG. 12 shows how the end walls 44 and the several electrode and spacer frames nest one within the other to form a bipolar electrode stack. When fully nested within the spacer frames, the electrode frames 4 abut, face-to-face, the spacer frames 30 providing a relatively high interfacial sealing area at the seam therebetween and a tortuous path for electrolyte attempting to escape from the electrolyte region 32 via the seam between the frames. FIG. 12 also shows a microporous glass mat separator 58 positioned within the spacer frame 30. This separator will preferably be of the type commonly used in gas recombinant batteries and accordingly is naturally thicker than the narrow dimension of the electrolyte region 32 and compressed between the electrode when the stack is assembled.

In accordance with the present invention, the assembled stack is positioned in an appropriate mold and molten polymeric material (e.g., thermoplastic or thermoset) injected thereabout to form an outer housing 60 which embeds the several frames and holds them together (see FIG. 13) in leak-tight fashion. Prior to molding the housing, the stack is preferably placed between the mold halves used to define the mold cavity for shaping the housing. The mold halves engage the end walls 44 and come together to compress the glass mat separators 58, nest the several frames and hold the frames together during injection of the polymer. In this regard the glass mats 58 have a thickness which is about 20% to about 50% greater than the electrolyte region between the electrodes and the force of the mold halves actually move the frames together and compress the mats into their respective electrolyte retention regions. Alternatively, the stack may be banded together adjacent the top and bottom corners of the stack with a strapping material (e.g., adhesive tape not show) which becomes embedded in the housing material after molding. Nesting of the frames one with the other is particularly advantageous in connection with the present invention, as it prevents lateral shifting of the frames in the mold under the influence of the injection pressures.

The injected polymer will preferably contain about 20% by weight of a foaming agent (e.g., F-CL Foaming Agent sold by Wilson Fiberfill International) and is injected under low pressure about the stack. At temperatures in excess of 350° F. the foaming agent produces CO, $CO_2$ and ammoniacal foaming gases which expand and foam the plastic to completely fill the mold cavity without subjecting the stack to the high injection molding pressures otherwise required to fill out the mold cavity. The finished housing will preferably have a porosity of up to about twenty-five percent (25%) by volume which provides sufficient mold filling capability without compromising housing strength. Moreover, the foamed container helps to insulate the battery's innards from the ambient temperature (e.g., vehicle engine compartment heat).

While the invention has been disclosed primarily in terms of a specific embodiment thereof it is not intended to be limited thereto, but rather only to the extent set forth hereafter in the claims which follow.

The embodiments of the invention in which an exclusive property or privilege is claimed are defined as follows.

1. A bipolar battery comprising:

a stack of substantially planar, bipolar electrodes each comprising a conductive, electrolyte-impervious, septum, having a positive polarity active material on one face of said septum, an opposite polarity active material on the opposite face of said septum, and engaged on its periphery by a nonconductive frame;

a monopolar electrode at each end of said stack;

a spacer spacing said electrodes from each other in said stack and defining an electrolyte retention region between adjacent said electrodes;

an electrolyte absorbent mat compressed between adjacent said electrodes in said retention region;

terminal means engaging said monopolar electrodes for electrically connecting said battery to external electrical circuitry; and a unified polymeric housing molded in situ about the entire stack so as to embed and hold said frames securely together, prevent electrolyte leakage therebetween and form a container for the battery.

2. A bipolar battery according to claim 1 wherein said housing comprises a closed cell foam.

3. A bipolar battery according to claim 2 wherein said foam has a porosity of up to about twenty-five percent (25%) by volume.

4. A bipolar battery comprising:

a stack of substantially planar, bipolar electrodes each comprising a conductive, electrolyte-impervious, septum, having a positive polarity active material on one face of said septum, an opposite polarity active material on the opposite face of said septum, and engaged on its periphery by a discrete nonconductive frame;

a monopolar electrode at each end of said stack and engaged on its periphery by a discrete nonconductive frame;

a plurality of nonconductive spacer frames each spacing a pair of said electrodes from each other in said stack and together enclosing and defining the boundaries of a plurality of regions retaining all of the battery's electrolyte between adjacent said electrodes;

terminal means engaging said monopolar electrodes for electrically connecting said battery to external electrical circuitry; and a unified polymeric housing embedding said frames so as to hold said frames securely together in face-to-face relation to prevent electrolyte leakage therebetween and form a container thereabout.

5. A bipolar battery according to claim 4 including an electrolyte absorbent mat compressed between adjacent said electrodes in said region.

* * * * *